May 8, 1951  E. E. BURFORD  2,551,873
BALE BINDING MECHANISM FOR BALING PRESSES
Filed Dec. 11, 1945  5 Sheets-Sheet 1

Inventor
Earl E. Burford
By
A. Yates Dowell
Attorney

May 8, 1951          E. E. BURFORD          2,551,873

BALE BINDING MECHANISM FOR BALING PRESSES

Filed Dec. 11, 1945          5 Sheets-Sheet 2

May 8, 1951   E. E. BURFORD   2,551,873
BALE BINDING MECHANISM FOR BALING PRESSES
Filed Dec. 11, 1945   5 Sheets-Sheet 5

Inventor
Earl E. Burford
By A. Yates Dowell
Attorney

Patented May 8, 1951

2,551,873

UNITED STATES PATENT OFFICE 2,551,873

BALE BINDING MECHANISM FOR BALING PRESSES

Earl E. Burford, Lindsay, Okla.

Application December 11, 1945, Serial No. 634,366

13 Claims. (Cl. 100—20)

This invention relates to improvements in baling presses and particularly to presses such as hay balers which compress material such as hay or straw into bales of convenient size and weight for handling and bind the bales by suitable binding strands, and has particular reference to improved mechanism for continuously binding the bales as they are formed by the baling press.

It is therefore an object of the present invention to provide an improved automatic bale binding mechanism for a baling press which will bind the bales with wire strands and which is relatively inexpensive and durable and will form a satisfactory union between the ends of wire strands retaining the bales in shape.

A further object resides in the provision of an improved bale binding mechanism which will operate with wire of the strength and hardness required for the purpose, without subjecting the wire to sharp bends or unusual strains that would result in breakage of the wire either during the tying operation or in subsequent handling of the bales.

A still further object resides in the provision of an improved bale binding mechanism which will operate successfully even though subjected to a large degree of wear or to the jamming and clogging action of dust and litter accumulating in the mechanism from the hay or other materials being baled.

An additional object resides in the provision of an improved bale binding mechanism of the character indicated which produces a joint or twist in the wire which is sufficiently strong that it will not become unfastened during ordinary handling of the bale but which may be readily unfastened by hand when it is desired to loosen the bale.

Another object of the invention resides in the provision of an improved bale binding mechanism in which the parts operate in timed relation with the remainder of the baling press mechanism and thus avoid the possibility of damage to the parts of the press or the binding mechanism.

Another object resides in the provision of an improved bale binding mechanism which produces a union or twist of the wire ends having relatively long flexible end portions with blunt ends which will not subject a person handling the bales to the danger of clothing damage or personal injury.

Another object resides in the provision of an improved bale binding mechanism which will successfully tie the retaining wire strands on bales of varying length and which may be easily changed to place a desired tension on the retaining strands.

Another object resides in the provision of an improved bale binding mechanism of the character indicated of compact construction disposed within the normal general dimensions of the baling press structure.

Further objects and advantages of the invention will be apparent from the following description, taken in conjunction with accompanying drawings wherein:

Figure 6 is a somewhat diagrammatical view illustrating the manner in which the bale binding strand or wire is twisted together by the binding mechanism;

Figure 7 is a perspective view on an enlarged scale showing the strand or wire twisting element in detail;

Figure 8 is an elevational view of a fragmentary portion of the mechanism showing the plunger actuated clutch trip mechanism;

Figure 9 is an elevational view of a fragmentary portion of the press showing a preferred form of wire or strand dispensing means carried by the press;

Figure 10 is a plan view on an enlarged scale showing a fragmentary portion of a tied bale and the manner in which the binding wire is twisted together by the binding mechanism.

Figure 1:
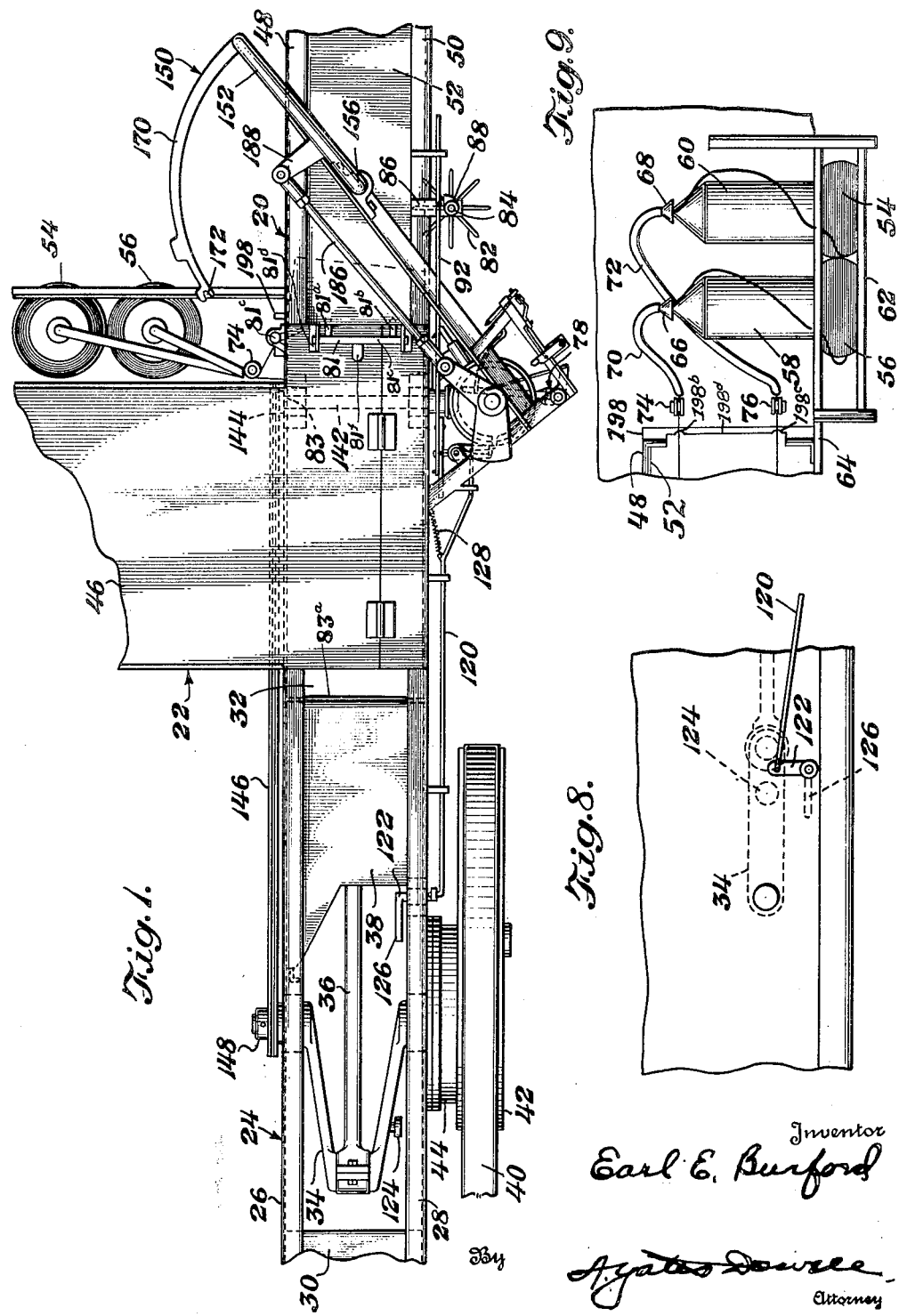
Figure 1 is a top plan view of a baling press for baling hay or similar material showing bale binding mechanism constructed according to the invention applied thereto.

With continued reference to the drawings and particularly to Figure 1 the numeral 20 generally indicates the bale chamber portion of the binding press, numeral 22 generally indicates the feed chamber portion of the baling press and the numeral 24 generally indicates the press extension on the side of the feed chamber opposite the bale chamber which supports the compressing plunger and its operating mechanism.

The extension 24 may conveniently comprise four angle irons the two upper ones being indicated at 26 and 28 in Figure 1. These angle irons are secured together by suitable braces and plates or gussets, as indicated at 30 and 32, to constitute a rigid structure of rectangular cross-section.

The structure 24 carries suitable bearings which journal a crank shaft 34 to which is connected one end of the pitman or connecting rod 36 the opposite end of which is pivotally connected to the reciprocating compressing plunger 38.

The shaft 34 is driven from a suitable power source through suitable means such as the belt 40, belt pulley 42 and reduction gear 44, interposed between the pulley and the corresponding end of crank shaft 34. The plunger 38 is moved by the crank shaft 34 entirely through the feed chamber 32 and into the end of the bale chamber 20 adjacent the feed chamber, which end will be hereinafter designated as the forward end of the bale chamber.

In the form of press illustrated the material to be compressed into bales is fed through the feed chamber of the machine through one side of the press along the conveyer 46. This conveyer may be of the traveling belt type or of any other construction which may be found convenient or desirable.

The bale chamber 20 is also constituted by four angle irons, the upper two of which are indicated at 48 and 50 in Figure 1, and these angle irons are secured together by continuous plates on top and bottom, the top plate being indicated at 52. On the sides the upper and lower angle irons are secured together by plates at their forward ends and at the rear ends are held in adjusted position with respect to each other by means of a conventional screw adjusting mechanism, not shown, which controls the compression of the material in the bale.

Suitable axles, not shown, are disposed beneath the extension 24 and the bale chamber 20 which axles are provided with suitable wheels for supporting the machine. It is also common practice to mount a driving engine on the forward end of the extension 24, such engine being operatively connected with the belt 40 or other means for driving the crank shaft 34.

The mechanism so far described will feed hay or similar material into the feed chamber 22 and the reciprocating plunger 38 forces the material back into the bale chamber 20 in which it is compressed into bales. Such mechanism is entirely conventional and may be of any desired construction, the particular form illustrated being similar to that shown and described in United States Patent No. 2,362,861 issued November 14, 1944, to Stanley D. Russell, to which reference may be had for a more detailed description of the general construction of the baling press.

In the arrangement shown in Figure 1 two rolls of wire are indicated at 54 and 56. These rolls are carried on dispensing devices particularly illustrated in Figure 9. Each dispensing device may conveniently comprise a cylindrical member, as indicated at 58 and 60, fixed at its bottom to a support or platform 62 suspending from a frame 64 supported at one side of the bale chamber 20 along the feed chute 46. Each of the cylindrical members is provided with a conical top and immediately above the apex of each top there is disposed an inverted funnel shaped member, as indicated at 66 and 68, connected respectively with tubular guides 70 and 72 which lead to wire guides 74 and 76 mounted on the press adjacent the forward end of the bale chamber. Each of the guides 74 and 76 may conveniently take the form of a grooved roller rotatably mounted on a pin or axle secured to the press by a suitable bracket. As the wire is fed to the press it is drawn from the rolls 54 and 56 into the funnel members 66 and 68 and feeds through the tubes to the corresponding wire guides 74 and 76. If desired, guards or covers in addition to the funnels 66 and 68 may be provided to prevent the wire from snarling or fouling as it is taken off of the rolls.

From the wire guides 74 and 76 the wire passes across the forward end of the bale chamber 20 and the end of the wire is held by a wire holder the upper one of which is generally indicated in Figure 1 by the numeral 78. The two holders are shown in Figure 3 as indicated by 78 and 80, and the holder 80 is shown in somewhat greater detail in Figures 2 and 5.

With the wires held across the forward end of the bale chamber by the corresponding wire holders, the machine is operated and material to be baled is fed into the feed chamber 22 and forced by the plunger 38 back into the bale chamber 20. As the material is forced into the bale chamber the necessary length of wire is drawn off of the wire rolls 54 and 56 and passes over the guides 74 and 76 into the bale chamber where it slips around the end of the growing bale as the bale is forced into the bale chamber by material compressed by the plunger against its forward end. This compressed material is held under compression in the bale chamber by suitable mechanism as indicated at 81. In the type of machine indicated there is a set of two dogs 81a and 81b pivotally mounted on each of the four sides of the bale chamber. Each pair of dogs is mounted on a shaft 81c which is pivoted at its ends in suitable brackets 81d and 81e secured to the bale chamber and provided intermediate its length with a pressure spring arm 81f the construction being such that the dogs 81a and 81b move out of the way as the material is forced into the bale chamber and are returned by the corresponding spring arms 81f to a position in which they engage the material and hold it under compression as the plunger is retracted. At the rearward end of the feed chamber there is a knife element 83 which cooperates with a ledger plate on the face of the plunger to sever each charge of material that is forced into the bale chamber, from the material remaining on the feeding mechanism. Thus each charge forced into the bale is entirely separate and when the bales are formed they are free of each other and are discharged separately from the machine.

As the bale moves through the bale chamber a measuring wheel 82 is rotated by the bale. This measuring wheel is in the form of a star or spiked wheel having spaced radially directed points and it is fixedly mounted on a shaft 84 journaled in a suitable bracket 86 secured to one side of the bale chamber. The circumferential dimension of the wheel 82 is such that one complete revolution of the wheel measures off the desired bale length. Obviously the length of the bale may be varied at any time by using a measuring wheel of a different circumferential dimension.

The shaft 84 is rotated with the wheel 82 and carries a cam 88 which, in one operative position, engages a lug or stop 90 on a rod member 92 supported at one side of the press by suitable brackets through which the rod may freely slide. This rod member 92 is yieldingly urged to its inoperative position by suitable means, such as the coiled tension spring 94, this construction being shown in somewhat greater detail in Figure 3.

Near its end opposite the lug 90 the rod 92 is pivotally connected to a latch member 96 which has an abutment 98 engaging a lug or pin 100 on a slide rod 102 which is generally parallel to the rod 92 so that when the rod 92 is moved to the right, as viewed in Figure 3, by engagement of the cam 88 with the lug 90 the rod 102 will also be moved to the right.

Rod 102 is operatively connected with the outer end of an arm 104 fixed to the upper portion of a vertical shaft 106 mounted at the side of the bale chamber by suitable brackets, as indicated at 108 and 110. At its lower end this shaft 106 carries an arm 112 which engages the control arm 114 of clutch 116. The arm 112 is fixed to the shaft 106 against rotation relative thereto and a second arm 118 is mounted on the shaft below the arm 112 but is rotatable relative to the shaft and also engages the clutch control arm 114 for a purpose which will presently appear.

From the mechanism above described it will be apparent that when the measuring wheel 80 has completed a revolution thereby measuring off the desired length of a bale, it will through the intermediacy of the cam 88, lug 90, rod 92, latch 96, lug 100, rod 102, arm 104 and shaft 106, move the arm 112 out of engagement with the clutch control arm 114, leaving the clutch free to engage as soon as the arm 118 is also moved out of engagement with the control arm 114.

A shaft or rod 120 is pivotally connected at one end to the arm 118 and pivotally connected at its opposite end to a lever 122 journaled on the side of the press extension 24. A roller 124 is mounted on the crank shaft 34 and the lever 122 has an arm 126 disposed in the path of this roller as the roller is carried around by rotation of the shaft. Each time the crank shaft reaches a predetermined position in its rotation which corresponds to a predetermined position of the plunger 38, the roller 124 strikes the arm 126 causing the lever 122 to pull on the rod 120 and move the arm 118 out of engagement with the clutch control arm 114. The rod 120 is moved against the action of the lever 122 by suitable means such as the coiled tension spring 128 connected between a point on the rod and a point fixed to the press structure. The manner in which the roller 124 engages the lever 122 to move the rod 120 is particularly shown in Figure 8.

With the above described mechanism it is apparent that two conditions are necessary to cause the clutch 116 to engage. First the bale must have reached a length sufficient to have given a complete rotation to the measuring wheel 82 and the plunger 38 must be at or near a definite predetermined position in its stroke.

Figure 3:
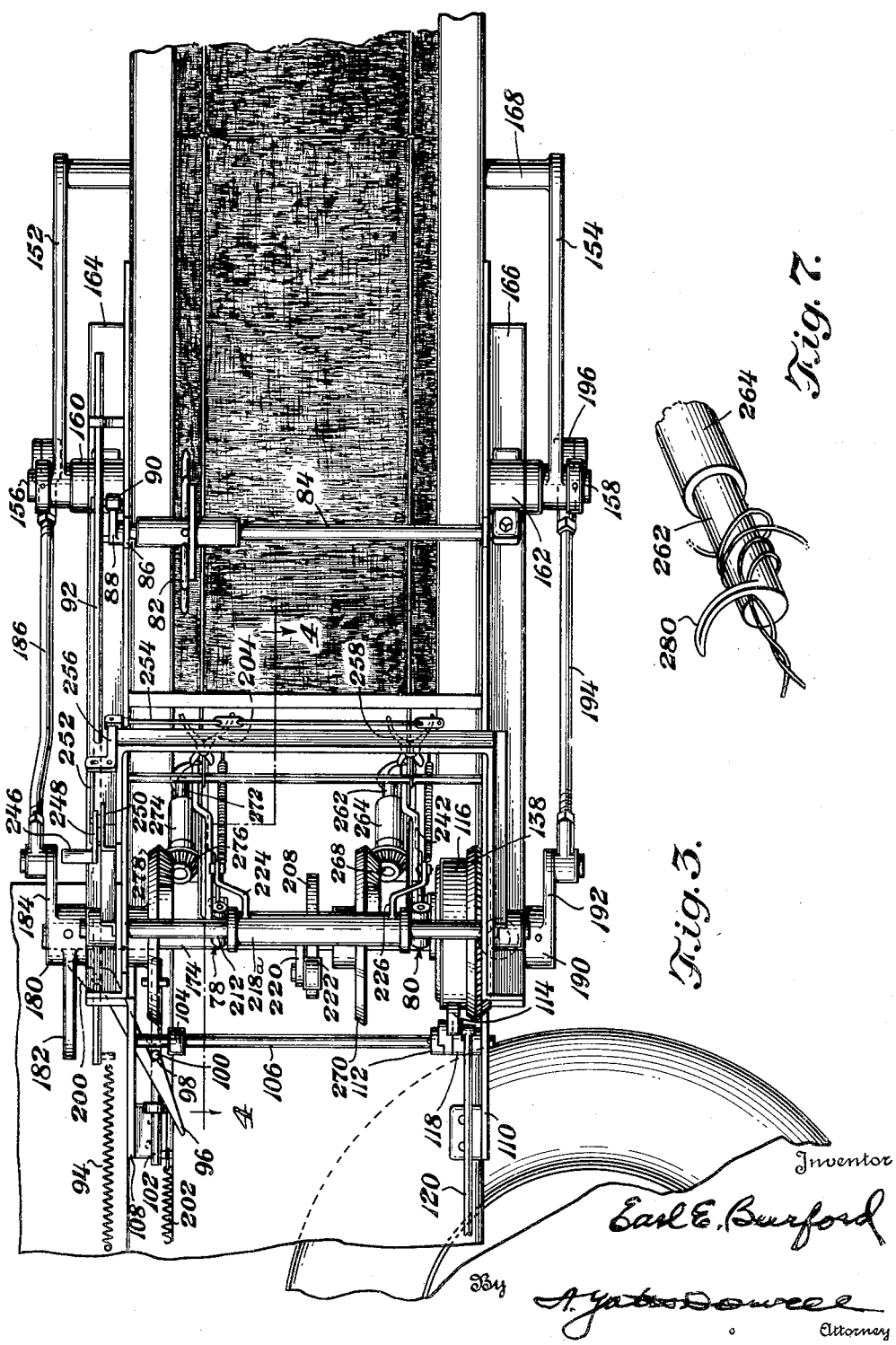
Figure 3 is an elevational view of one side of the baling press showing a portion of the improved bale binding mechanism.
Figure 4:
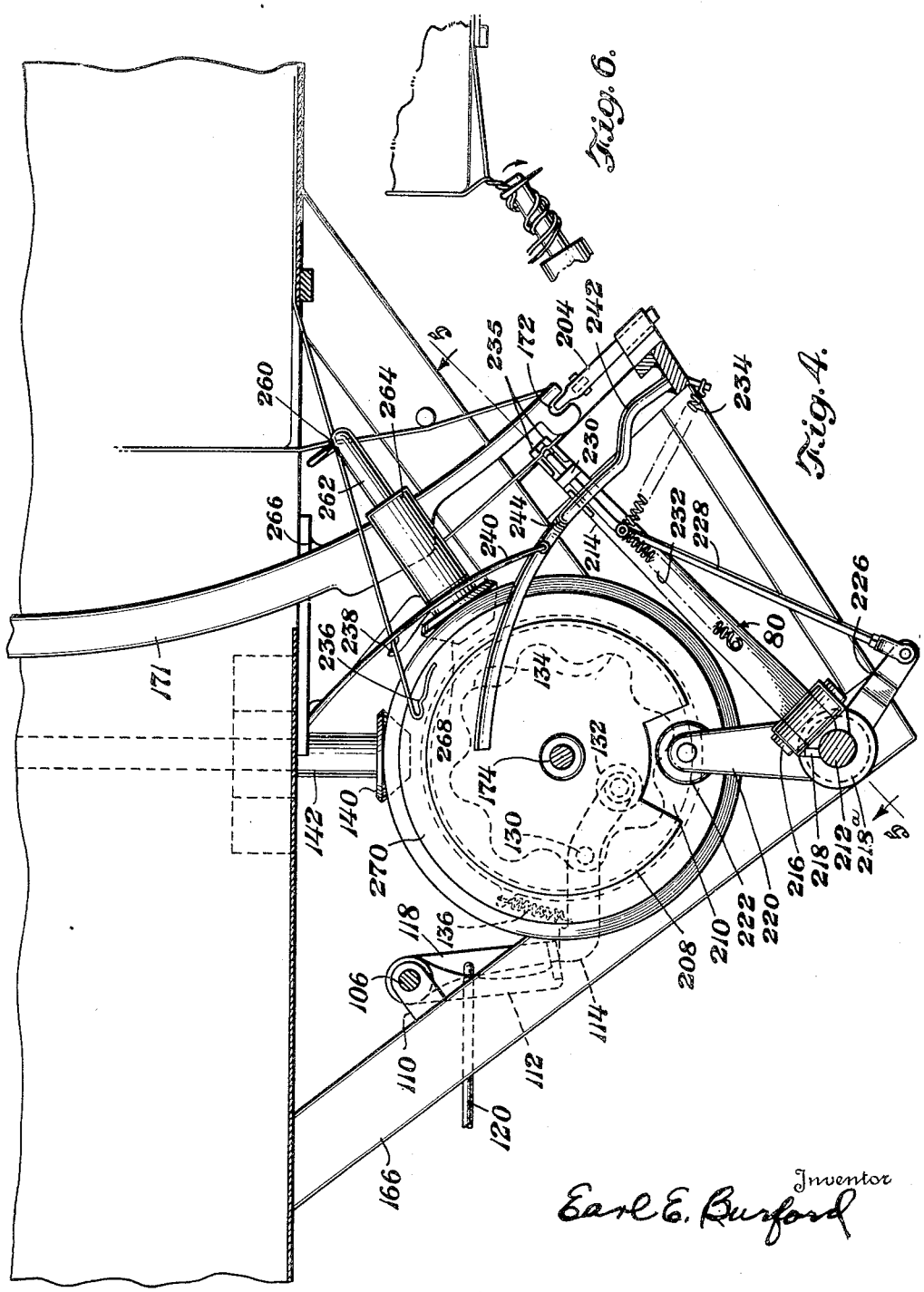
Figure 4 is a horizontal sectional view taken on the line 4—4 of Figure 3.

Suitable clutch mechanism is indicated in Figure 4. The clutch control arm 114 is pivotally mounted intermediate its length, as at 130, on the upper part of the clutch in the position of the clutch shown in the Figure 3. At its end opposite the end engaged by the arms 112 and 118 the control arm 114 carries a roller 132. The lower portion of the clutch is provided with an aperture in the edge of which a plurality of equally spaced recesses are formed, as indicated at 134. In the clutch illustrated there are eight such recesses providing what is commonly known in the art as an eight point clutch. When the outer end of arm 114 is released by both of the arms 112 and 118 a spring 136 swings the arm 114 about its pivot 130 and brings the roll 132 into engagement with the nearest recess 134 in the direction of clutch rotation. This operation of lever 114 locks the two parts of the clutch together and the two parts of the clutch then are rotated together until the control lever 114 again comes into contact with the ends of arms 112 and 118 or one of them, which will move the roller out of the recess in which it is engaged. This provides a one revolution clutch provided at least one of the arms 112 or 118 is returned to clutch disengaging position before the clutch has made a complete revolution. The lower clutch member is provided exteriorly with a beveled gear 138 which meshes with a beveled pinion 140 secured on the end of a shaft 142 extending transversely beneath the press at a location adjacently the junction of the feed chamber and the bale chamber. At its opposite end the shaft 142 has secured thereon a driving element, such as the chain sprocket 144 which is operative connected by the link chain 146 with a sprocket 148 secured on one end of the crank shaft 34. By this arrangement the lower member of the clutch is continuously rotated at all times during operation of the machine and the upper clutch member is rotated for one revolution each time the clutch controlling arm 114 is tripped.

Referring to Figs. 1 and 3 the numeral 150 generally indicates a wire passing device. This device may conveniently comprise a pair of levers as indicated at 152 and 154 each pivotally mounted at one end on respective axles or trunnions 156 and 158 mounted in suitable brackets 160 and 162 secured to respective frame members 164 and 166 rigidly secured to and extending diagonally across the top and bottom structures of the bale chamber, respectively. The free ends of the levers 152 and 154 are inter-connected by a vertical cylindrical member 168 to which are secured the ends of a pair of arcuate wire passing members or needles, the upper one of which is indicated at 170 in Figure 1. At the end opposite the end secured to the member 168 each of these wire passing elements is provided with a transverse groove in which the wire is retained as it is passed across the front end of the bale chamber and with a longitudinal notch 172 which receives a portion of a corresponding wire cutting or severing device, as will later appear.

Figure 2:
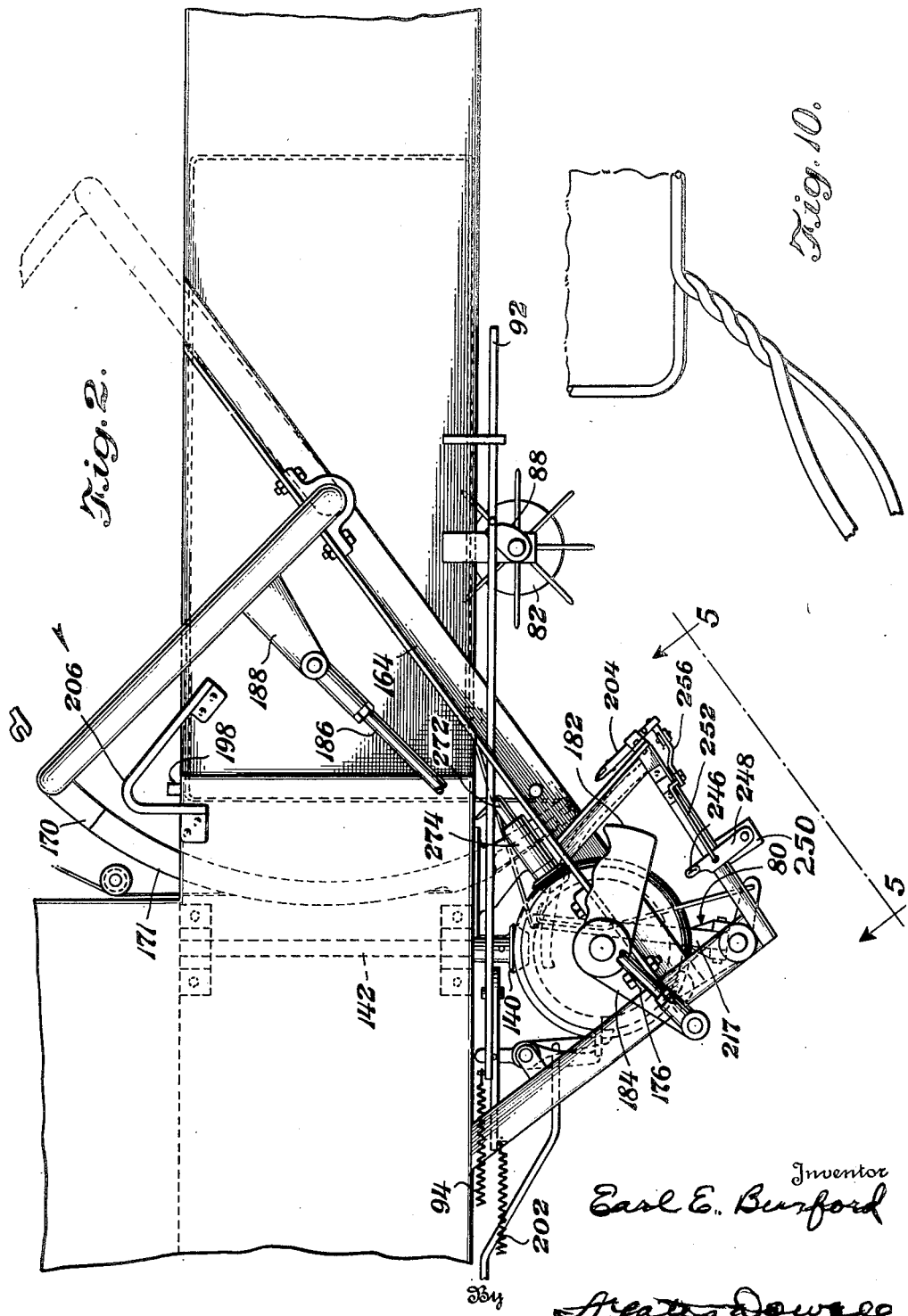
Figure 2 is a top plan view similar to Figure 1 showing the bale binding mechanism on a somewhat enlarged scale.
Figure 5:
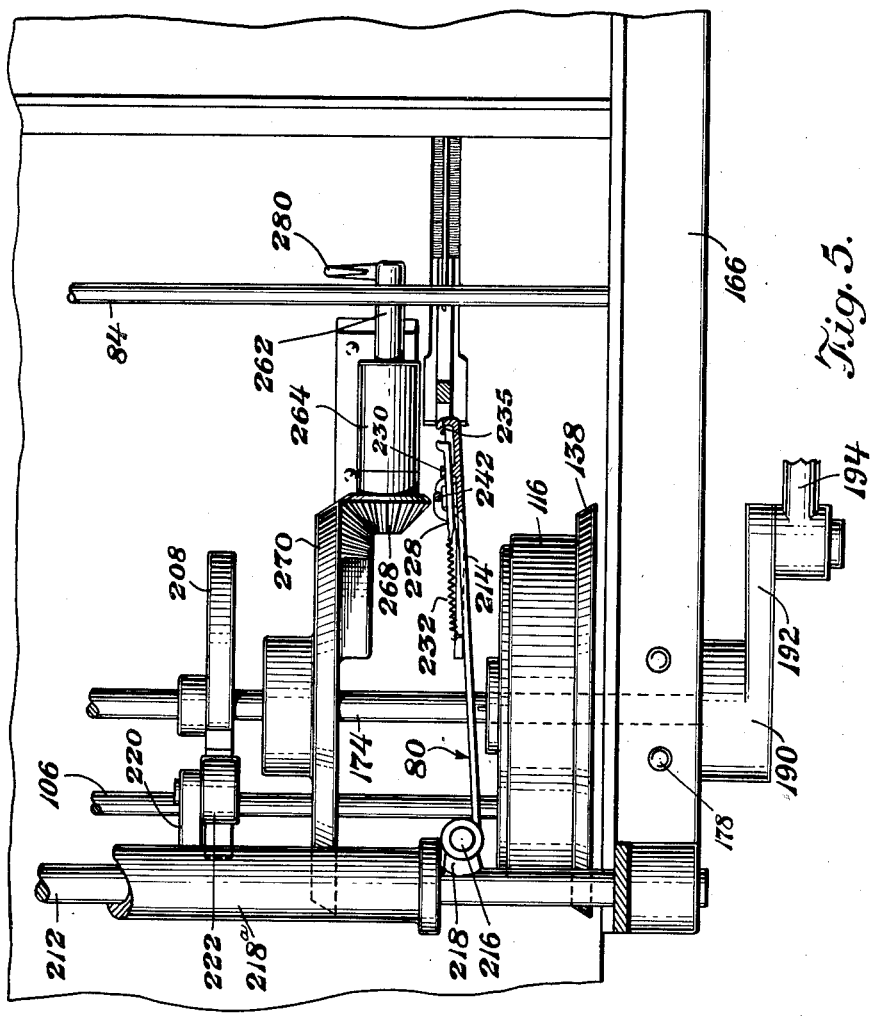
Figure 5 is an elevational view of a fragmentary portion of the binding mechanism taken on the line 5—5 of Figure 2.

The upper portion of the clutch 116 is fixed to the lower end portion of a shaft 174 which is journaled at its ends in suitable bearings the upper one of which is indicated at 176 in Figure 2 and the lower one of which is indicated at 178 in Figure 5. These bearings are secured respectively to the diagonally disposed frame members 164 and 166. A collar 180 is fixed to the upper end of shaft 174 and is provided with a pair of radially extending arms 182 and 184. The arm 184 is pivotally connected at one end to a link rod 186 the opposite end of which is pivotally connected to an arm 188 extending laterally from the corresponding side of the upper lever member 152. The lower end of the shaft 174 carries a collar 190 from which extends an arm 192 similar to the arm 184. To the outer end of this arm 192 there is pivoted one end of a link rod 194 the opposite end of which is connected to an arm 196 extending from the lever member 154 and corresponding to the arm 188.

With the mechanism thus far described, when the shaft 174 is rotated and swings the arms 184 and 192 about the shaft axis, the link rods 186 and 194 will pull the corresponding arms 188 and 196 around and swing the levers 152 and 154 about their pivotal mountings on trunnions 156 and 158 and will project the wire passing elements through the press across the forward end of the bale chamber. As the wire passing elements move into the bale chamber they pick up the wires extending over the corresponding wire guides 74 and 76 and double or loop the wire across the forward end of the bale chamber.

The wires are held in position in the path of the wire engaging ends of the passing elements by the rollers 74 and 76 and guide element 198 which may be in the form of a vertical rod 198a secured to the corresponding side of the bale chamber and provided with notches 198b and 198c for receiving the wires and holding them in position.

During one-half revolution of the shaft 174 the wire passing elements are moved from the position shown for the element 170 in Fig. 1 to the position shown for the same element in Fig. 4. The link rods 186 and 194 are made adjustable so that the terminal position of the passing members as they carry the wires across the bale chamber can be adjusted with the necessary degree of accuracy.

During this first half revolution of the shaft 174 the arm 182 contacts an upwardly extending finger 200 on the latch member 96 raising the latch member to release the lug 100. The coil tension spring 202 then moves the rod 102 backwardly to bring the arm 112 in position to engage the clutch arm 114 and release the clutch upon completion of one revolution of the shaft 174. The arm 118 is, of course, moved out of clutch engagement position each time the plunger crank shaft 34 makes a revolution.

Referring now particularly to Figure 4, the lower wire passing element 171 has brought the double wire through the forward end of the baling chamber and in position such that the wire cutter 204 extends into the notch 172 and straddles the length of wire extending across the end of the notch. The terminal position of the wire passers is determined by a suitable stop as indicated at 206 in Figure 2, but this position is not absolutely critical as the wire cutters are provided with blades of considerable length and can permit a tolerance in the order of one-half to three-quarters of an inch in the position of the wire at the terminal position of the wire passers. This not only accommodates any reasonable inaccuracy in manufacture but also accommodates the mechanism to a considerable degree of wear to the wire groove at the end of the wire passing member.

The shaft 174 carries a cam 208 in the form of a circular disk having a notched-out portion 210. The wire holders, generally indicated at 78 and 80, are mounted on a vertical shaft 212 journaled at its upper and lower ends in suitable brackets mounted on the frame members 164 and 166. The lower wire holder 80, particularly illustrated in Figure 4, comprises a flat, substantially horizontal arm 214 having one end hinged by a substantially horizontal pin 216 and bracket 218 to shaft 212. With this construction the arm may swing about the vertical axis of shaft 212 and may also swing about the horizontal axis of pin 216. The upper wire holder 78 is provided with a similar arm as indicated at 217 as shown in Fig. 2.

A sleeve 218a is rotatably mounted on shaft 212 intermediate its length and is provided with a radially projecting arm 220 to which is secured a roller 222 which contacts the peripheral surface of the cam 208. The sleeve 218a also carries radially extending, vertically spaced arms 224 and 226, the lower arm 226 being pivotally connected at its outer end to a corresponding end of a slide member 228 which projects through a suitable aperture in a rib 230 extending upwardly from the surface of the arm 214. The slide member is retracted by suitable means such as a coil tension spring 232. At its outer end the arm 214 is provided with a pair of upstanding elements 235 and the end of the slide member 228 is positioned between and cooperates with these elements to grip the wire firmly between the elements and end of the slide. The entire wire holder mechanism is resiliently urged to swing in a clockwise direction, as viewed in Figure 4, about the axis of shaft 212 by a suitable coil tension spring 234.

The notch 210 in cam 208 is so positioned angularly of the shaft that shortly before the wire passing member 170 reaches its terminal position the roller 222 drops into the notch and releases the wire holder from the end of the wire. The spring 234 then swings the wire holder from its position in which it gripped the wire end, as indicated at 236, to the position illustrated in Fig. 4. The released wire end may then hook on lug 238 carried by a support 240 in the path or movement of the wire end to prevent the tension in the wire from moving this wire end out of position to be tied during the subsequent operation of the device. As the wire holder is moved from its normal position to its position as illustrated in Figure 4 at which it obtains a new grip on the wire, it rides under the member 242. This member 242 has its under surface arranged in spaced horizontal planes so that during the first part of this movement the wire holder is maintained below the wire until the elements 235 reach a position at the remote side of the wire from the remainder of the arm 214. This occurs at the bend in the member 242 as indicated at 244. After the wire holder passes this bend it is permitted to rise until the portion of the arm 214 immediately at the inner side of the lugs 235 is brought into contact with the wire. As the cam continues to rotate the side of the notch 210 engages the roller 222 and swings the arm 220 about the axis of the shaft 212. This shaft acts to swing the arm 226 and move the slide member 228 outwardly. This serves to firmly grip the wire between the end of the slide member and the elements 235. However, before the wire holder begins to swing as a unit about the axis 212 the arm 184, as shown in Figure 2, comes in contact with an upstanding portion 246 of a lever 248 pivotally mounted on a bracket 250 secured to the frame member 164. This lever 248 is connected through link rods 252 and 254 and bell crank 256 with the wire cutters 204 and 258. Movement of the lever 248 by this contact actuates the wire cutters to sever the wires at the ends of the wire passing elements. This event takes place at about one-half revolution of the shaft 174. The wire passing elements now start to be retracted through the bale chamber and at the same time the roller 222 rides up on the surface of cam 208 to rotate the sleeve 218 and swing the wire holders 78 and 80 in a counter-clockwise direction toward their original position. As the force required to swing the wire holders against the force of spring 234 is transmitted to the arm 226 through slide 228 of wire holder 80 and the corresponding elements of wire holder 78, the wire ends will be firmly gripped by the wire holders as the holders are returned toward their original position.

While only the lower wire holder 80 and the lower wire end anchor 238 have been described in detail it is to be understood that the upper wire holder and corresponding anchor are of duplicate construction. When the wire passers bring the wires through the front end of the baler chamber they cross the passed wire over the end portion of the wire held by the wire holder at the wire tying side of the press, the cross-over point of the two wires being indicated at 260 in Fig. 4.

A rotatable shaft 262, journaled in a bearing bracket 264 mounted by a bracket extension 266 to the side of the bale chamber, terminates at one end adjacent the cross-over point 260. At its opposite end the shaft 262 carries a beveled gear 268 which meshes with a mutilated beveled gear 270 mounted upon the shaft 174. Fig. 4 illustrates the lower shaft, journal, bracket, beveled pinion and mutilated gear. Reference to Figure 3 indicates that there is a similar upper shaft 272 mounted in corresponding journal bracket 274 and provided with a beveled pinion 276 meshing with a mutilated gear 278 also carried by the shaft 174.

These elements constitute the two wire twisting or tying devices for the two vertically spaced bale wires, and as they are substantially duplications of each other, it is considered that a further detailed description of only one of them is sufficient for the purposes of this disclosure.

The detailed construction of the wire twisting portion of the shaft 262 is shown in Figure 7. The end portion of the shaft is given a generally spiral formation providing an elongated spiral finger or hook 280 extending outwardly from the shaft in a plane substantially perpendicular to the shaft axis. However, this hook or finger may be inclined relatively to the shaft axis if desired to control the adjustment of the final tension of the wire about the bales. If the finger is inclined the shaft 262 will be correspondingly lengthened or shortened so that the outer end of the hook is maintained substantially at the location of the cross-over point 260 but the point of actual twisting of the wire is shifted toward or away from the corner of the bale depending upon whether it is desired to increase or decrease the wire tension. A relatively narrow slot or groove is provided in the end of the shaft 262 between the root portion of the finger 280 and the adjacent portion of the shaft, this groove being of sufficient width to snugly receive the wire ends and hold them by moderate friction during the twisting operation. This groove, however, is sufficiently restricted so that the two wires cannot be turned simultaneously in its confines.

The mutilated gears 270 and 278 are so located angularly relative to the shaft 174 that the shaft 262 will have turned approximately one-half of a revolution at the time the arm 182 strikes the lever portion 246 to sever the wires and the cam following roller 222 rides up on the advancing side of the notch 210 in the cam 208. This connects the wire ends with a sufficient wrap to prevent any flying of the severed ends and retains the two wire ends in the twister but at the same time is not sufficient to prevent such movement of the wire end portions as may be necessary to establish a normal tension on the corresponding bale surrounding wires.

After the wires have been severed, the wire passing elements start to retract and the wire holders start to return to their original or normal position, the wire twisters continue to rotate until the wire has been twisted or wrapped together a number of complete turns. While the number of turns is not highly critical I have found in practice that four complete turns provides a satisfactory union of the wire ends and is easily accomplished within the limits of the machine and while the plunger is in that portion of its stroke in which it cannot interfere with the wire passing elements. It is thus possible to provide at least four wrapping turns to the wire ends without the necessity of stopping the plunger at any time during the operation of the machine.

The form of tie or union produced by the mechanism is clearly illustrated in Figure 10.

As indicated in Figs. 6 and 7, while the wires are being wrapped together the long ends of the wire tend to wrap themselves about the portion of the shaft 262 between the hook 280 and the adjacent end of the bearing bracket 264. This, however, does not constitute any material disadvantage as I have found that the wrap about the shaft is extremely loose and the wire ends readily strip from the shaft as the bale is moved down the baling chamber as the machine starts to form a new bale.

It will also be noted that the cutters are so positioned that the wire is cut straight across while held under tension. This provides a partial cutting or partial breaking and severing operation which avoids any sharp ends or corners on the ends of the wire which together with the length of the wire ends avoids any danger of injury from sharp, stiff, wire ends projecting from the bale. I have also found that even though strands of hay happen to be accidently twisted into the joint this does not seem to disadvantageously affect the strength of the twisted joint.

While I have shown a binding mechanism having duplicate elements for securing two spaced strands about a bale it is to be understood that one or more additional sets of elements may be added if it is desired to use three or more binding strands.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Binding means for a baling press having a feed chamber and a bale chamber comprising, strand guide means on said press adjacent the forward end of said bale chamber and at one side thereof; a movable and releasably engageable strand holding means, a strand twisting means and strand cutting means on the opposite side of said press adjacent the forward end of said bale chamber; means for passing strands across the front end of said bale chamber; and power operated means actuating said strand holding, strand twisting, strand cutting and strand passing means in timed relationship, means releasing said strand holding means from said strand, means moving said strand holding means to a new position on the strand just before the strand is cut, and means subsequently returning said strand gripping means to its original position firmly gripping the end portion of the strand.

2. Binding means for a baling press having a feed chamber and a bale chamber comprising wire guides and wire dispensing means at one side of the bale chamber, a movable and releasably engageable means at the opposite side of the bale chamber holding the ends of the wire; means mounted on the bale chamber operative to pass the wire across the front end of said chamber from said guides to said holding means; wire twisting means located adjacent said wire holder in position to engage the end portion and passed over portion of the wire; wire severing means located adjacent said wire holder in position to sever the passed over wire at a position past said wire twisting means; and means for driving said wire passing means, said wire holder, said wire twister and said wire severing means in timed sequence such that the wire is passed across the bale chamber and crossed over the corresponding held end portion, the twister engages the crossed over end portions, the wire holder is released and re-engaged at a new position on the wire, the wire is severed and then twisted while the wire passing means returns to its initial position.

3. Bale binding means for a baling press having a feed chamber, a bale chamber at one end of said feed chamber, and a reciprocating plunger including drive means to move it through said feed chamber into the adjacent end of said bale chamber; said binding means comprising wire guide means at one side of said press adjacent the feed chamber end of said bale chamber; wire dispensing means on said side of said press; wire holding, wire twisting and wire cutting means on the opposite side of said press adjacent the feed chamber end of said bale chamber; means for passing wire across said bale chamber from said wire guide means to said wire holding, twisting and cutting means; power operated means actuating said wire passing, holding, twisting and cutting means comprising a clutch driven from the plunger drive means, clutch actuating means operating in timed relationship with said plunger and controlled by bale length; a shaft driven by said clutch; operative connections between said shaft and said wire passing, holding, twisting and cutting means, said clutch actuating means comprising a bale measuring wheel; a first clutch release lever; connecting means between said measuring wheel and said first lever comprising a pair of longitudinally movable rod members, cam means operated by said measuring wheel for moving one of said rod members, an operative connection between the other rod member and said first lever, resilient means connected to said rod members to return them to clutch disengaging position, and a latch connection between said rod members operable by engagement of said clutch for a partial rotation thereof to release the lever connected rod member and permit said first lever to return to clutch disengaging position; a second clutch release lever; and means operating in timed relationship with said plunger to move said second lever into and out of clutch releasing position, the arrangement being such that said clutch can engage only when both said levers are moved simultaneously out of clutch releasing position.

4. Wire holding means for a bale binding mechanism comprising a shaft mounted for partial rotation; a sleeve on said shaft rotatable relative thereto; an arm hinged to said shaft at one end and movable relative to said shaft about an axis substantially at right angles to said shaft axis and provided at its opposite end with wire engaging elements; a slide member carried by said arm having one end constructed to cooperate with said wire engaging elements to grip a wire and having its opposite end pivotally connected with an arm extending from said sleeve; means operatively connected with said sleeve for moving said slide member from its retracted to its wire gripping position and for moving said arm extending from the sleeve in one direction through force exerted on said slide member; resilient means urging said slide and said arm extending from the sleeve to move in the opposite directions; and a guide member controlling movements of said arm about the axis of said hinge.

5. In a baling mechanism comprising a bale forming chamber having four sides, means for feeding material to be baled to said chamber, a bale compressing means operable within said chamber, a wire supply adjacent one side of said chamber, a strand of wire extending from the source of supply across the bale chamber, movable means for releasably gripping the end of the strand of wire at the opposite side of the bale chamber whereby during formation of a bale by said compressing means the strand of wire extending across the bale chamber is formed around one end of the bale, means for carrying a looped strand of wire from the supply around the other end of a completed bale, one portion of said looped strand being laid across the strand of wire held on the opposite side, means for engaging said crossed wires at their intersection for temporarily holding them, means operable during said temporary holding for releasing the gripping means, means operable during said temporary holding for actuating said gripping means to grip another portion of said looped strand, means operable during said temporary holding for cutting said looped strand to separate the strand into two portions, and means operable subsequent to said cutting operation to twist the crossed wires together.

6. In a baling mechanism comprising a bale forming chamber having four sides, means for feeding material to be baled to said chamber, a bale compressing means operable within said chamber, a wire supply adjacent one side of said chamber, a strand of wire extending from the source of supply across the bale chamber, means for releasably gripping the end of the strand of wire at the opposite side of the bale chamber whereby during formation of a bale by said compressing means the strand of wire extending across the bale chamber is drawn and formed around one end of the bale, means for engaging said wire between the bale and the source of wire supply and operable to carry said wire from the supply around the other end of a completed bale as a double continuous strand having two portions spaced apart at their adjoining ends, one portion of said double continuous strand being laid across the strand of wire held on the opposite side, means for engaging said crossed wires at their intersection for temporarily holding them, means operable during said temporary holding for releasing the gripping means, means operable during said temporary holding for actuating said gripping means to grip another portion of said double continuous strand, means operable during said temporary holding for cutting said double continuous strand to separate the strand into the two portions, said holding means including a rotatable shaft and a spiral shaped radially extending finger and being operable subsequent to said cutting operation to twist the crossed wires together.

7. In a baling mechanism comprising a bale forming chamber having four sides, means for feeding material to be baled to said chamber, a bale compressing means operable within said chamber, a wire supply adjacent one side of said chamber, a strand of wire extending from the source of supply across the bale chamber, means for releasably gripping the end of the strand of wire at the opposite side of the bale chamber whereby during formation of a bale by said compressing means the strand of wire extending across the bale chamber is drawn and formed around one end of the bale, needle means for engaging said wire between the bale and the source of wire supply and operable to carry said wire from the supply around the other end of a completed bale as a double continuous strand having two portions spaced apart at their adjoining ends, one portion of said double continuous strand being laid across the strand of wire held on the opposite side, means for engaging said crossed wires at their intersection for temporarily holding them, means operable during said temporary holding for releasing the gripping means, means operable during said temporary holding for actuating said gripping means to grip another portion of said double continuous strand, means operable during said temporary holding for cutting said double continuous strand to separate the strand into the two portions, said holding means being operable subsequent to said cutting operation to twist the crossed wires, said means for twisting including a rotatable shaft and a spiral shaped radially extending finger, said finger forming a crotch with the rotatable shaft and said means for engaging the crossed wires at their intersection and temporarily holding them comprising the crotch formed between the radial finger and the rotatable shaft.

8. A self-tying baler construction comprising in combination with a bale chamber having means for feeding material to be baled thereto, a plunger mechanism operable to compress said material, a needle mounted for oscillation on an axis at one side of the bale chamber, said needle being operable to pass completely through the bale chamber beyond the side thereof opposite its pivot axis and to carry a looped strand of wire thereacross from the side of the bale chamber on which the needle is pivoted, a tying structure positioned at the other side of the bale chamber, said tying structure including supporting means spaced from the side of the bale chamber at the side opposite the pivot axis of the needle, releasable gripping means movably carried on said supporting means for movement in the direction of the bale chamber and the wires to be carried around the bales and also movable away from the plane in which the needle moves, a strand of wire extending across the bale chamber, said gripping means being arranged and constructed to engage the end of a strand of wire extending across the bale chamber, said strand during the formation of the bale being drawn around the projected end of the bale while being held by said gripping means, said needle being operable after the formation of a bale to carry a double looped strand of wire across the bale into a predetermined position with respect to the tying structure, one portion of said looped strand being positioned across the previously mentioned strand at an angle with respect thereto, hook means carried by said tying structure operable to engage said crossed wires at their crossover point to hold them in said intersected position, said gripping means being operable thereafter to disengage the first-mentioned strand of wire and to move in the direction of the looped strand of wire and toward said looped end thereof, cutting means operable to sever the looped strand between the two portions thereof, said gripping means being operable to grip the free portion, and means operable thereafter to move said gripping means carrying the gripped wire therewith back to its original position and out of the path of the plunger mechanism.

9. A self-tying baler construction comprising in combination with a horizontal bale chamber having means for feeding thereto material to be baled, a plunger mechanism operable to compress said material, spaced curved needles mounted for oscillation on a vertical axis at one side of the bale chamber, said needles being operable to pass completely through the bale chamber in spaced horizontal planes beyond the side thereof opposite their pivot axis and to carry looped strands of wire thereacross from the side of the bale chamber on which the needles are pivoted, tying structures positioned at the other side of the bale chamber, each tying structure including supporting means spaced from the side of the bale chamber at the side opposite the pivot axis of the needles, a releasable gripping means movably carried on said supporting means for movement in the direction of the bale chamber and the wires to be carried around the bales and also movable away from the plane in which the needle moves, strands of wire extending across the bale chamber, each of said gripping means being arranged and constructed to engage the end of a strand of wire extending across the bale chamber, said strand during the formation of the bales being drawn around the projected end of the bale while being held by said gripping means, said needle being operable after the formation of a bale to carry a double looped strand of wire across the bale into a predetermined position with respect to the tying structure, one portion of said looped strand being positioned across the previously mentioned strand at an angle with respect thereto, hook means carried by said tying structure operable to engage said crossed wires at their intersection for holding them in said intersected position, said gripping means being operable thereafter to disengage the first-mentioned strand of wire and to move longitudinally of the bale chamber in the direction of the looped strand of wire and toward the end of said looped strand, cutting means operable to sever the looped strand between the two portions thereof, said gripping means being operable to grip the free portion, and means operable thereafter to move said gripping means carrying the gripped wire therewith back to its original position and simultaneously away from the needle path.

10. A self-tying baler construction comprising in combination with a bale chamber having four sides, means for feeding material to the bale chamber, a plunger mechanism operable to compress said material, spaced needles pivotally mounted for oscillation on an axis at one side of the bale chamber, said needles being operable to pass completely through the bale chamber beyond the side thereof opposite their pivot axis, means for supplying strands of wire from the side of the bale chamber on which said needles are pivoted, tying structure positioned at the side of the bale chamber opposite the pivot axis of said needles, a supporting shaft spaced from the side of the bale chamber on the side thereof opposite the first axis of the needles and parallel to said axis, a sleeve rotatably mounted on said shaft, two sets of releasable wire gripping members secured respectively to said shaft and to said sleeve, means to oscillate said shaft and said sleeve as a unit to change the positions of the wire-gripping members, means to oscillate the sleeve relative to the shaft to grip and to release a wire, said wire-gripping members being pivoted on an axis at right angles to the axis of the shaft for movement in a direction axially of the supporting shaft, a pair of spaced cam means carried by the tying structure for moving the gripping members axially of the carrying shafts during rotation about said shaft whereby the gripping portions thereof traverse a helicoidal path, the gripping members being at an extreme point of said path in an initial position in which position strands of wire are extending across the bale chamber and are gripped by said members, said strands during the formation of the bale being drawn around the projected end of the bale while being held by said gripping members, said needles being operable after the formation of a bale to carry double looped strands of wire across the bale chamber and into predetermined positions with respect to said tying structure, one portion of each looped strand being positioned across the corresponding previously mentioned strand at an angle with respect thereto, a pair of hook means carried by said tying structure and arranged and constructed to engage said crossed wires for holding them in crossed over condition, said gripping members being operable thereafter by rotation of the shaft and by simultaneous relative rotation of the sleeve to disengage the wires and to move in helicoidal paths to their other extreme position to engage another portion of the looped strands, and cutting means operable to sever the looped strands between the two portions thereof, said gripping members being operable by rotation of the vertical shaft in the opposed direction and by simultaneous relative rotation of the sleeve with respect to the shaft to move axially of the supporting shaft along their helicoidal paths to grip said other portions and to carry the respective second portions of the wires therewith out of position of the paths traversed by the needles during their travel.

11. A device as set forth in claim 10 in which cam elements are carried by the tying structure with which the wires are engageable during the return movement of the gripping means and the gripped wire, said cam elements being provided with a hook portion engageable by the wires at the end of the movement of the gripping members.

12. In a baling mechanism comprising a bale forming chamber having four sides, means for feeding material to be baled to said chamber, a bale compressing means operable within said chamber, a wire supply adjacent one side of said chamber, a strand of wire extending from the source of supply across the bale chamber, movable means for releasably gripping the end of the strand of wire at the opposite side of the bale chamber whereby during formation of a bale by said compressing means the strand of wire extending across the bale chamber is drawn and formed around one end of the bale, means for engaging said wire between the bale and the source of wire supply and operable to carry said wire from the supply around the other end of a completed bale as a double continuous strand having two portions spaced apart at their adjoining ends, one portion of said double continuous strand being laid across the strand of wire held on the opposite side, means for engaging said cross wires at their intersection for temporarily holding them, means operable during said temporary holding for releasing the gripping means, means operable during said temporary holding for actuating said gripping means to grip another portion of said double continuous strand, means operable during said temporary holding for cutting said double continuous strand to separate the strand into the two portions, and means subsequent to said cutting operation for twisting the crossed wires.

13. In a baling mechanism comprising a bale forming chamber having four sides, means for feeding material to be baled to said chamber, a bale compressing means operable within said chamber, a wire supply adjacent one side of said chamber, a strand of wire extending from the wire supply across the bale chamber to the opposite side, a wire twister element on said opposite side, means for releasably gripping the end of the strand of wire at the opposite side of the bale chamber whereby during formation of a bale by said compressing means the strand of wire extending across the bale chamber is drawn and formed around one end of the bale, means for engaging said wire between the bale and the wire supply and operable to carry said wire from the supply around the other end of a completed bale as a double continuous strand having two portions spaced apart at their adjoining ends, one portion of said double continuous strand being laid adjacent the strand of wire held on the opposite side, means for engaging said adjacent wires by said wire twister element, rotating said wire twister element to initially twist said wires for temporarily holding them, means operable during said temporary holding for releasing the gripping means, and means operable during said temporary holding for cutting said double continuous strand to separate the strand into two portions, said wire twister continuing to rotate subsequent to said cutting operation for completing the twisting of the wires.

EARL E. BURFORD.

REFERENCES CITED

The following references are of record in the file of this patent:

UNITED STATES PATENTS

| Number | Name | Date |
| --- | --- | --- |
| 743,998 | Wygant | Nov. 10, 1903 |
| 894,876 | Clark | Aug. 4, 1908 |
| 899,014 | Lyon | Sept. 15, 1908 |
| 963,180 | Robben | July 5, 1910 |
| 2,355,644 | Haase | Aug. 15, 1944 |